United States Patent
Choi

(10) Patent No.: US 8,743,308 B2
(45) Date of Patent: Jun. 3, 2014

(54) LAMP SOCKET, LIQUID CRYSTAL DISPLAY, AND METHOD OF MANUFACTURING THE SAME

(75) Inventor: Jae-Min Choi, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1126 days.

(21) Appl. No.: 12/200,676

(22) Filed: Aug. 28, 2008

(65) Prior Publication Data

US 2009/0190060 A1  Jul. 30, 2009

(30) Foreign Application Priority Data

Jan. 25, 2008 (KR) .................. 10-2008-0008233

(51) Int. Cl.
*G02F 1/1333* (2006.01)

(52) U.S. Cl.
USPC ........................................................... 349/58

(58) Field of Classification Search
USPC ........................................................... 349/58
See application file for complete search history.

(56) References Cited

U.S. PATENT DOCUMENTS

| | | | |
|---|---|---|---|
| 6,265,665 B1 * | 7/2001 | Zahnen | 174/92 |
| 7,042,157 B2 | 5/2006 | Chou | |
| 7,607,805 B2 | 10/2009 | Kwon et al. | |
| 2005/0026483 A1 * | 2/2005 | Latsis | 439/157 |
| 2005/0097706 A1 * | 5/2005 | Vackar | 16/330 |
| 2005/0148242 A1 | 7/2005 | Latsis | |
| 2007/0230169 A1 | 10/2007 | Kwon et al. | |
| 2008/0037278 A1 * | 2/2008 | Chang et al. | 362/611 |
| 2008/0146060 A1 * | 6/2008 | Kato et al. | 439/171 |

FOREIGN PATENT DOCUMENTS

| | | |
|---|---|---|
| JP | 2001-297844 | 10/2001 |
| JP | 2004-347122 | 9/2004 |
| JP | 2006-120428 | 5/2006 |
| JP | 2007-018880 | 1/2007 |
| JP | 2007-317545 | 12/2007 |
| JP | 2008-047528 | 2/2008 |
| KR | 1020070099156 | 10/2007 |

OTHER PUBLICATIONS

Japanese Office Action issued Apr. 16, 2013 in correspondence Japanese Patent Application No. 2009-12240.

* cited by examiner

*Primary Examiner* — Phu Vu
(74) *Attorney, Agent, or Firm* — F. Chau & Associates, LLC

(57) ABSTRACT

A lamp socket, a liquid crystal display, and a method of manufacturing the same, which facilitate assembly and testing of a lamp. The lamp socket includes a housing including connection terminals electrically connected to lamp terminals, a cover hinge-engaged with the housing, a fixing part fixing the housing and the cover to each other, and an angle maintenance part maintaining an angle of the cover in an open position, wherein the angle is an acute angle.

17 Claims, 24 Drawing Sheets

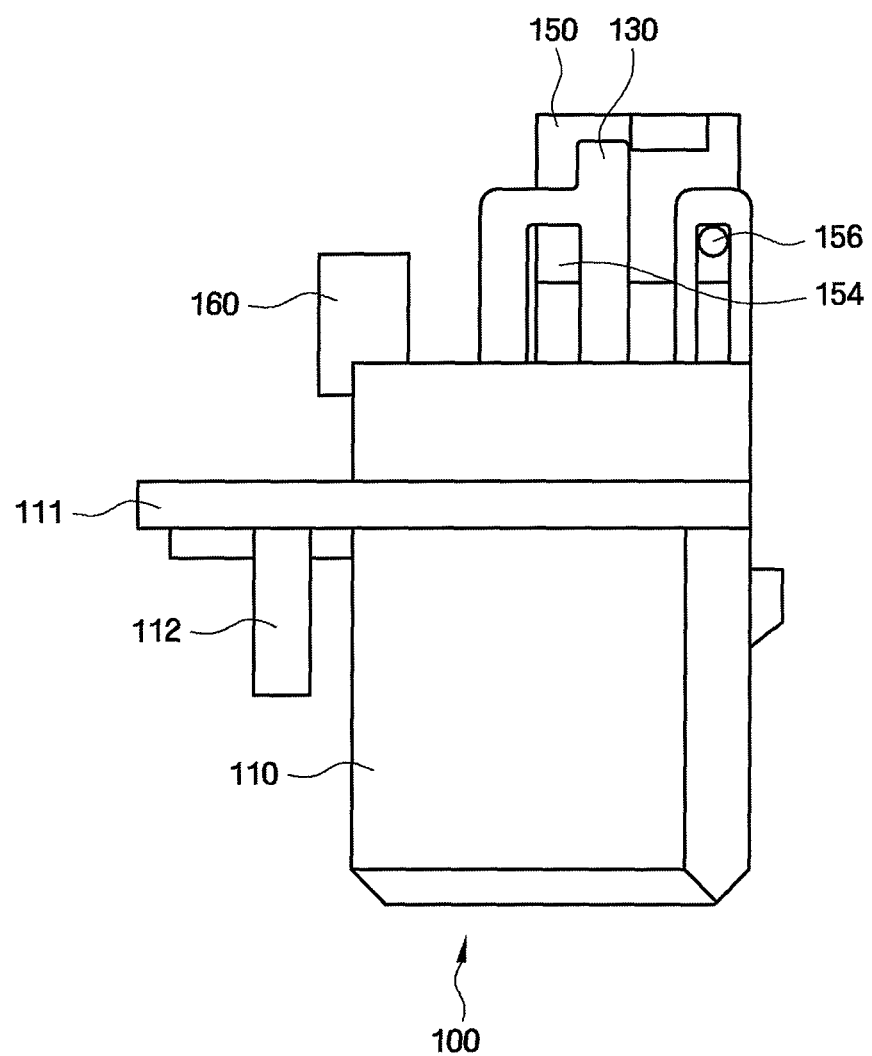

LAMP SOCKET, LIQUID CRYSTAL DISPLAY, AND METHOD OF MANUFACTURING THE SAME

CROSS-REFERENCE TO RELATED APPLICATION

This application is based on and claims priority from Korean Patent Application No. 10-2008-0008233, filed on Jan. 25, 2008, in the Korean Intellectual Property Office, the disclosure of which is incorporated herein in its entirety by reference.

BACKGROUND OF THE INVENTION

1. Technical Field

The present invention relates to a lamp socket, a liquid crystal display, and a method of manufacturing the same, and more particularly to a lamp socket, a liquid crystal display, and a method of manufacturing the same, which facilitate assembly and testing of a lamp.

2. Discussion of Related Art

With the development of modern society as an information society, demand for large-sized and thin display devices has increased. Since conventional CRT devices cannot fully satisfy such demand, flat display devices, such as a plasma display panel (PDP) device, a plasma address liquid crystal display panel (PALC), a liquid crystal display (LCD), an organic light emitting diode (OLED), and the like, have been developed.

A liquid crystal display (LCD) is a kind of flat panel display (FPD) that has been widely used, and is composed of two substrates, on which electrodes are formed, and a liquid crystal layer interposed between the two substrates. Liquid crystal molecules of the liquid crystal layer are rearranged by a voltage being applied to the electrodes, and thus the quantity of transmitted light is adjusted, so that an image is displayed.

Since the liquid crystal display is a passive display device, a backlight assembly is used for providing light to pass through the liquid crystal layer. As light sources for use in the backlight assembly, a cold cathode fluorescent lamp (CCFL), a hot cathode fluorescent lamp (HCFL), and the like, have been widely used, and in order to heighten the manufacturing efficiency of the liquid crystal display, various kinds of components, including a light source, are assembled through automated means.

Accordingly, there is a need for a structure which facilitates automatic assembly of a lamp using automation equipment and which facilitates testing of an insertion state of the lamp after the assembly.

SUMMARY OF THE INVENTION

Embodiments of the present invention provide a lamp socket that facilitates assembly and testing of a lamp, a liquid crystal display including a lamp socket that facilitates assembly and testing of a lamp, and a method of manufacturing a liquid crystal display including a lamp socket that facilitates assembly and testing of a lamp.

A lamp socket, according to an embodiment of the present invention, includes a housing including connection terminals electrically connected to lamp terminals; a cover hinge-engaged with the housing; a fixing part fixing the housing and the cover to each other; and an angle maintenance part maintaining an angle of the cover in an open position, wherein the angle is an acute angle.

A liquid crystal display, according to an embodiment of the present invention, includes a display panel displaying an image; lamps providing light to the display panel and including terminals; a housing including connection terminals electrically connected to the lamp terminals; a cover hinge-engaged with the housing; a fixing part fixing the housing and the cover to each other; and an angle maintenance part maintaining an angle of the cover in the open position, wherein the angle is an acute angle.

A method of manufacturing a liquid crystal display, according to an embodiment of the present invention, includes inserting a lamp socket into a receptacle, wherein the lamp socket includes a housing including connection terminals electrically connected to lamp terminals, a cover hinge-engaged with the housing, a fixing part fixing the housing and the cover to each other, and an angle maintenance part maintaining an angle of the cover in an open position, wherein the angle is an acute angle; inserting the lamp into the lamp socket; and closing the cover by applying pressure to an upper part of the cover.

BRIEF DESCRIPTION OF THE DRAWINGS

Embodiments of the present invention will be more apparent from the following detailed description taken in conjunction with the accompanying drawings, in which:

FIG. 4C is a side view of the lamp socket of FIG. 1;

DETAILED DESCRIPTION OF EXEMPLARY EMBODIMENTS

Figure 1:
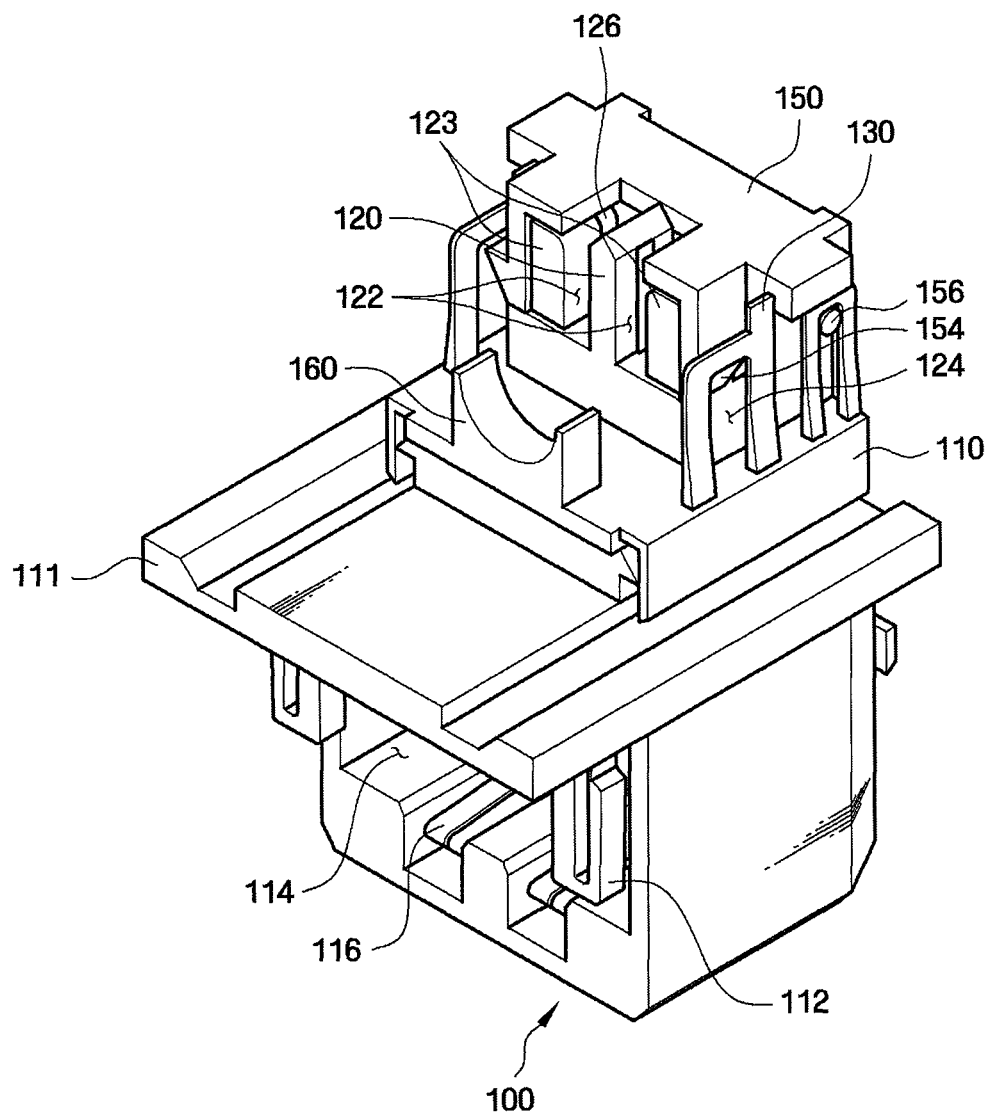
FIG. 1 is a perspective view of a lamp socket according to an embodiment of the present invention.

Hereinafter, exemplary embodiments of the present invention will be described in detail with reference to the accompanying drawings. The present invention may, however, be embodied in many different forms and should not be construed as being limited to the embodiments set forth herein.

The term "on" may be used to designate that an element is located directly on another element or a layer and an element is located on another element via another layer or another element. The same drawing reference numerals may be used to designate same or similar elements.

Figure 2:
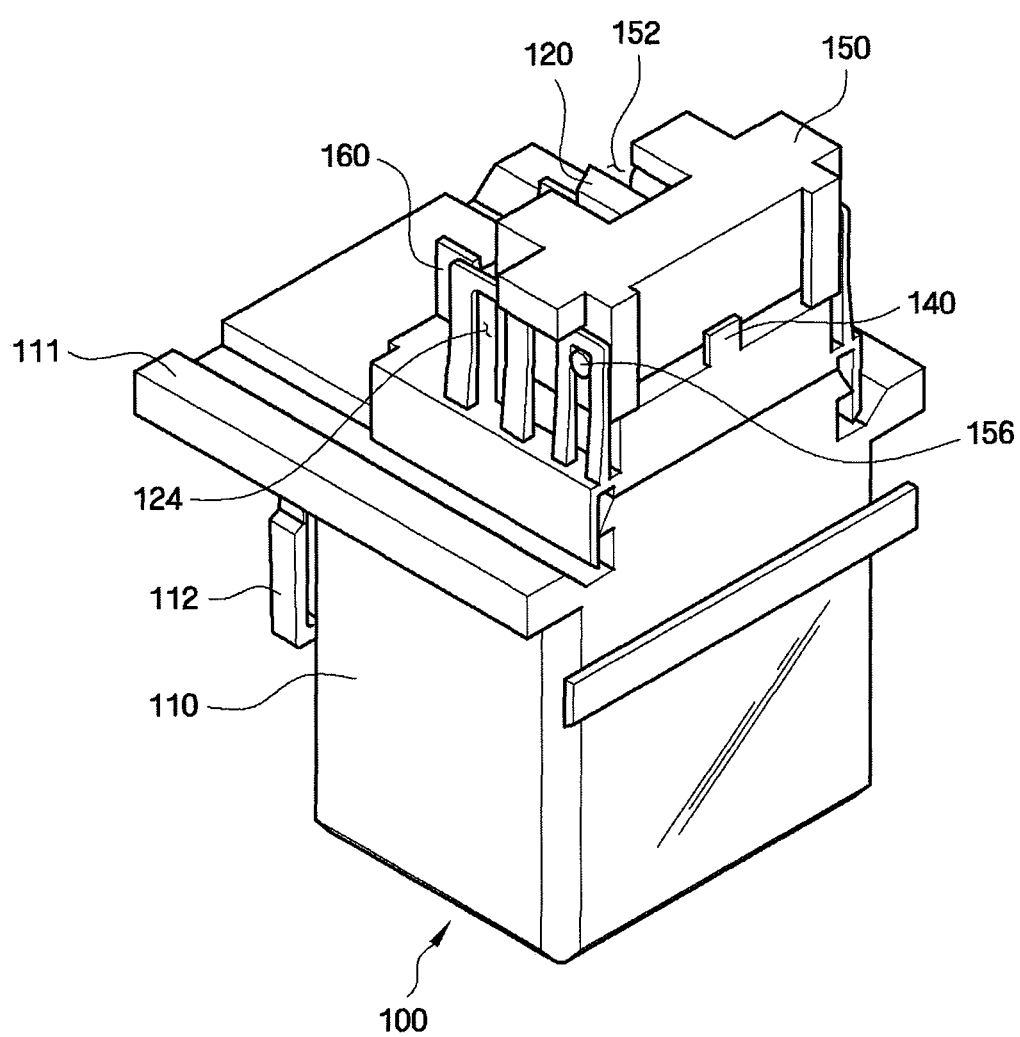
FIG. 2 is a perspective view of the rear part of the lamp socket of FIG. 1.
Figure 3:
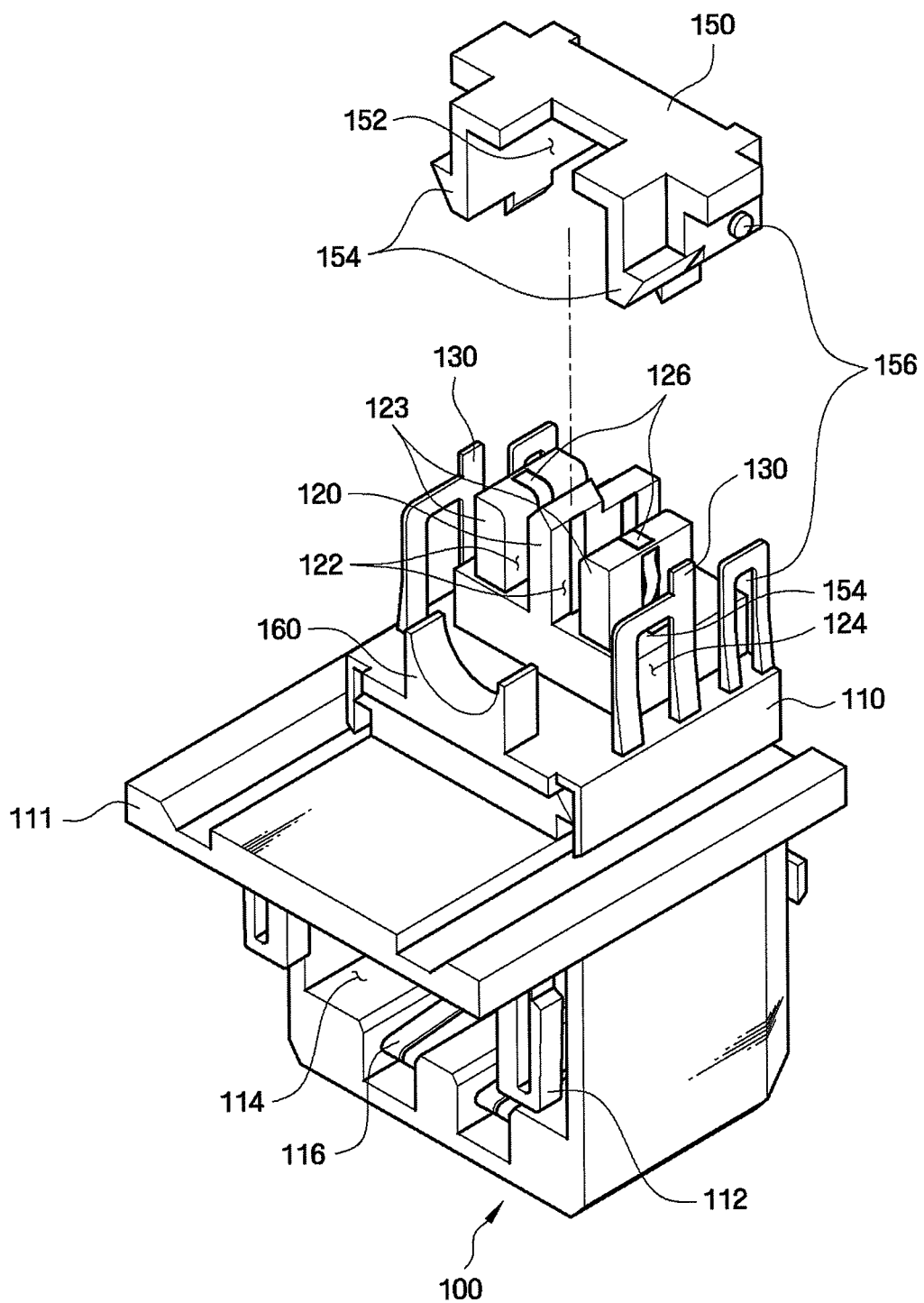
FIG. 3 is an exploded perspective view of the lamp socket of FIG. 1.
Figure 4A:
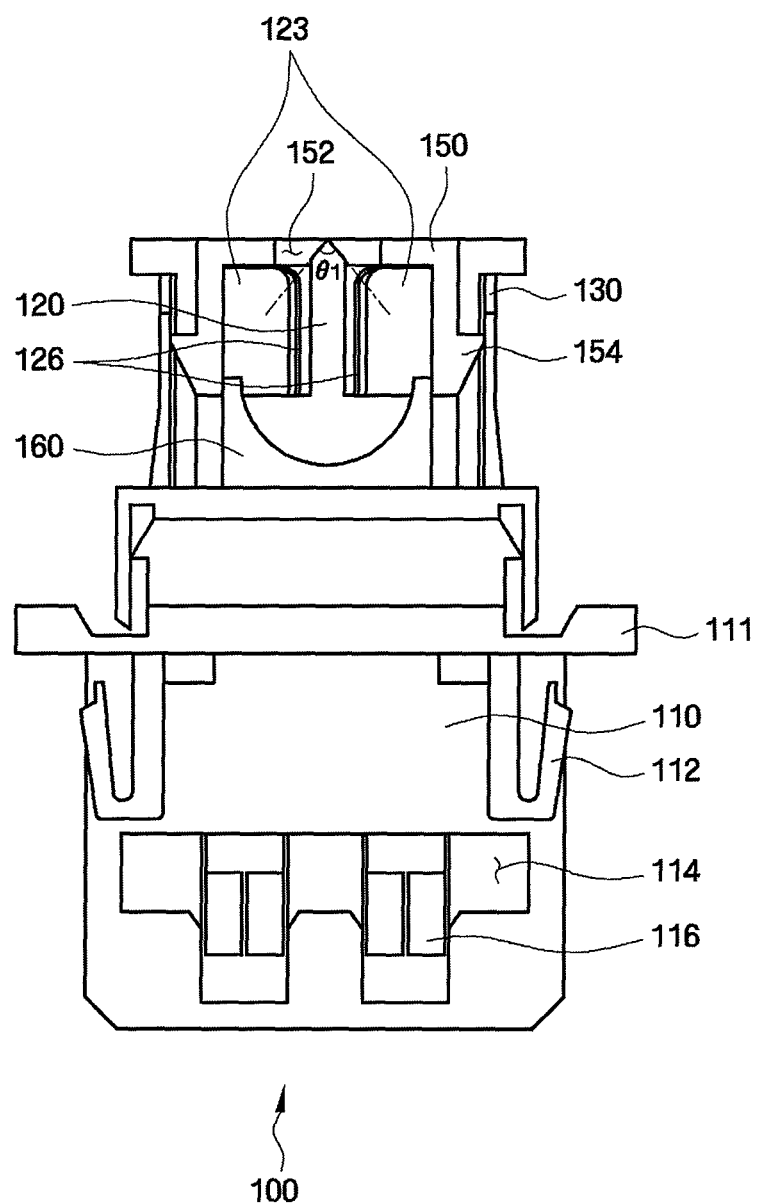
FIG. 4A is a front view of the lamp socket of FIG. 1.
Figure 4B:
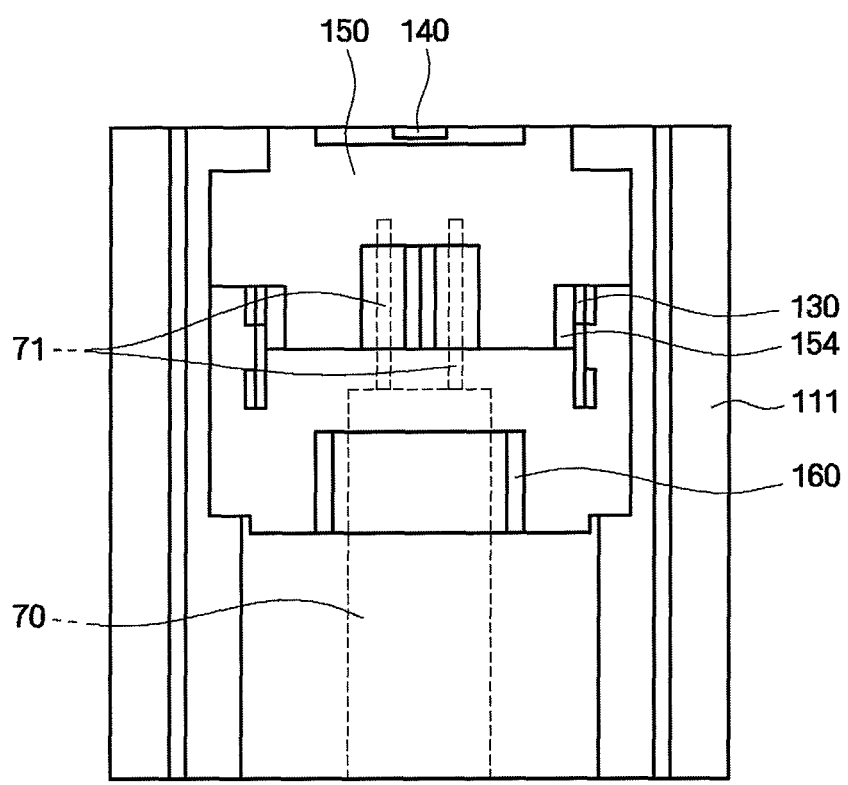
FIG. 4B is a plan view of the lamp socket of FIG. 1.
Figure 4D:
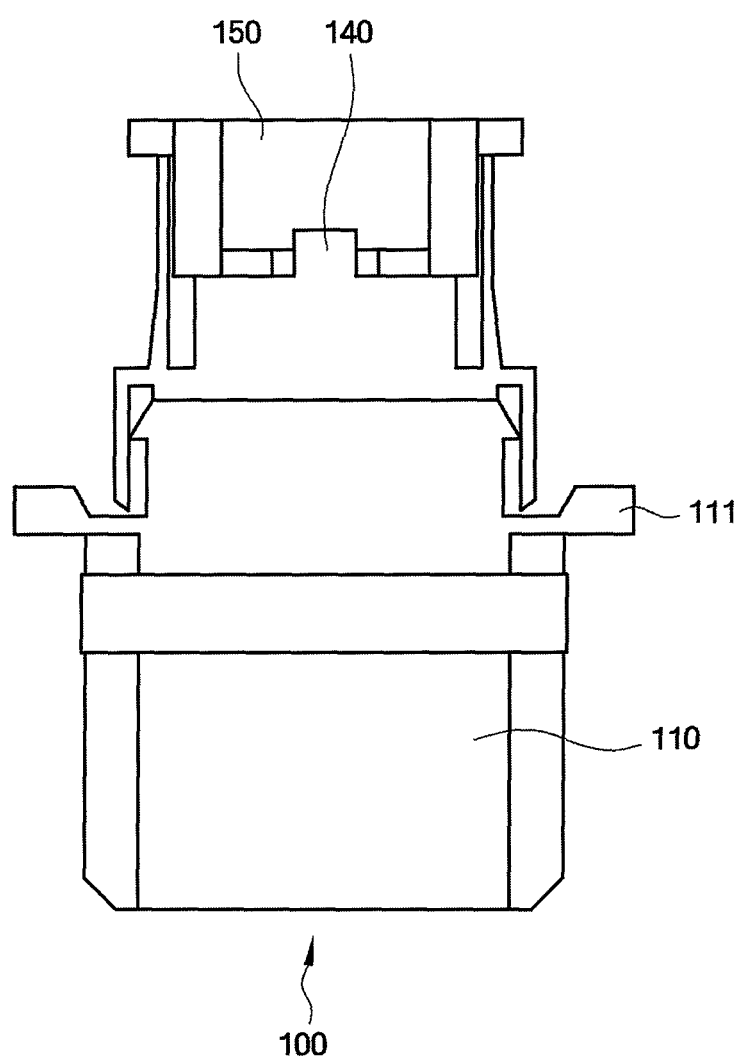
FIG. 4D is a rear view of the lamp socket of FIG. 1.

A lamp socket according to an embodiment of the present invention will be described in detail with reference to FIGS. 1 to 4D. FIG. 1 is a perspective view of a lamp socket according to an embodiment of the present invention, FIG. 2 is a perspective view of the rear part of the lamp socket of FIG. 1, and FIG. 3 is an exploded perspective view of the lamp socket of FIG. 1. FIG. 4A is a front view of the lamp socket of FIG. 1, FIG. 4B is a plan view of the lamp socket of FIG. 1, FIG. 4C is a side view of the lamp socket of FIG. 1, and FIG. 4D is a rear view of the lamp socket of FIG. 1.

Referring to FIGS. 1 to 3, a lamp socket 100 fixes a lamp 70 (see FIG. 12) thereto, and supplies power to the lamp 70. The lamp socket 100 is inserted into a lamp socket guide 105 (see FIG. 12), and then is fixed to a receptacle of a liquid crystal display 1 (see FIG. 12). The lamp socket 100 includes a housing 110, a socket fixing part 112, an inverter insertion opening 114, first connection terminals 126, second connection terminals 116, a guide member 120, a first angle maintenance part 130, a second angle maintenance part 140, a cover 150, an open part 152, and a hinge 156.

The lamp 70 is fixed to an upper end part of the housing 110, and an inverter (not illustrated) is inserted into a lower end part of the housing to supply a drive voltage to the lamp 70. On an upper end part of the housing 110, a lamp placement part 160 placing the lamp 70 thereon is provided. The lamp placement part 160 is formed to curve in the form of the lamp 70, so that the lamp 70 may be placed thereon. Specifically, one end part of the lamp 70 is placed on the lamp placement part 160, and two terminals 71 of the lamp 70 are inserted into lamp terminal insertion grooves 122, respectively.

The lamp terminal insertion grooves 122 are isolated from each other by the guide member 120, and include first connection terminals 126 connected to the lamp terminals 71, respectively.

The first connection terminals 126 supply a driving voltage to the lamp 70, and are connected to second connection terminals 116 formed on a lower end part of the lamp socket 100. The lamp 70 may be a hot cathode fluorescent lamp (HCFL) having two terminals provided on each end part thereof. The respective terminals are inserted into the lamp terminal insertion grooves 122, and are connected to the first connection terminals 126, respectively. The first connection terminals 126 are flexible, and once the lamp terminals are inserted, they are fixed so as not to separate from the lamp terminal insertion grooves.

The second connection terminals 116 receive the driving voltage from the inverter (not illustrated), and supply the received driving voltage to the first connection terminals 126. The inverter is inserted into the inverter insertion opening 114 formed in the lower end part of the lamp socket 100. The inverter may be inserted into the inverter insertion opening 114 by sliding in the lower part of a lower receptacle 90 (see FIG. 12).

As a result of a flange 111, the lower end part of the lamp socket 100 is exposed to an outside of the lower receptacle 90, and the upper end part of the lamp socket 100 fixes the lamp 70 in the lower receptacle 90. The lamp socket 100 engages with the lower receptacle 90 via the socket fixing part 112.

The socket fixing part 112 may be simply engaged with the lower receptacle 90 in a prominence and depression manner (i.e., the socket fixing part 112 and the lower receptacle respectively include a protruding part and a depressed part that receives the protruding part), or may be hook-engaged with the lower receptacle 90.

The lamp socket 100 is provided with a cover 150 formed on the upper end part thereof to prevent the inserted lamp 70 from separating from the lamp socket. One end part of the cover 150 is engaged with the housing 110 via a hinge 156, and the cover 150 is rotated about the hinge 156 to open/close the housing 110.

The cover 150 and the housing 110 are hinge-engaged with each other through the hinge 156 provided on one end part of each of the cover 150 and the housing 110, and are fixed to each other through a hook engagement using a hook part 154 provided on the cover 150 and a hook groove 124 provided on the housing 110. The hook part 154 is formed on the cover 150, and is engaged with the hook groove 124 formed on the housing 110. The hook engagement using the hook part 154 and the hook groove 124 is merely exemplary, and the cover 150 and the housing 110 may be engaged with each other using various means.

Referring to FIGS. 1, 3, and 4A, the guide member 120 guides the terminals of the lamp 70 so that the lamp terminals are inserted into the lamp terminal insertion grooves 122, respectively. The guide member 120 separates and isolates the terminals of the lamp 70 from each other and also facilitates the insertion of the lamp 70 into the housing 110.

The guide member 120 may be formed to be higher than support walls 123, which support the first connection terminals 126. When the lamp 70 is moved downward and is engaged with the housing by the automation equipment, the lamp terminals 71 are guided by the guide member 120 to be inserted into the lamp terminal insertion grooves 122, respectively.

The guide member 120 has an edge part of which the angle $\theta_1$ is about 40° to about 80°, so that the terminals of the lamp 70 can be easily inserted into the lamp terminal insertion grooves 122 when the lamp 70 is inserted into the lamp socket 100. The terminals of the lamp 70 are fixed between the first connection terminals 126 and the guide member 120, and are further prevented from separating from the lamp socket 100 by the cover 150.

Referring to FIGS. 1, 3, and 4B, the cover 150 includes the open part 152, and thus it can be easily checked whether the lamp terminals 71 are accurately inserted into the lamp terminal insertion grooves 122, respectively. Specifically, through the open part 152, parts of the guide member 120 and the lamp terminal insertion grooves 122 are exposed to an outside, and thus it can be easily checked whether the lamp terminals 71 are accurately inserted into the lamp terminal insertion grooves 122. Referring, for example, to FIG. 3, the open part 152 is formed in a U-shape with an open-end toward the body of the lamp.

The open part 152 may be formed to expose parts of the lamp terminals 71. That is, the open part 152 is formed with a size large enough to determine whether the lamp terminals 71 are accurately inserted into the lamp terminal insertion grooves 122, and the remaining part of the cover 150 covers the edges of the lamp terminals 71 to prevent the separation of the lamp 70 from the lamp socket 100.

As an alternative to the open part 152 being formed as shown in FIG. 3, the open part 152 may be formed as an open central region closed on all four sides, wherein the open central region exposes the lamp terminals 71. If the open part 152 is formed in this manner, the cover 150 can be easily engaged with the housing using the automation equipment.

Referring to FIGS. 1, 2, 4C, and 4D, the lamp socket 100 includes a first angle maintenance part 130 and a second angle maintenance part 140 that maintain an open angle of the cover 150.

The first angle maintenance part 130 prevents an open angle of the cover 150 from decreasing so that the cover 150 is open at a specified angle to expose the lamp terminal insertion grooves 122. The first angle maintenance part 130 is formed adjacent side parts of the support walls 123 apart from the support walls 123 at a specified distance. As illustrated in FIG. 4C, the first angle maintenance part 130 may be integrally formed with the hook groove 124. Alternatively, the first angle maintenance part may be formed separately from the hook groove 124. The first angle maintenance part 130 is projected upward with respect to the flange 111 to a predetermined height, and, like a stopper, supports the hook part 154 or the side part of the cover 150. The first angle maintenance part 130 prevents lowering of the open angle of the cover 150 below a specified angle to maintain the open angle at a predetermined value. For example, the open angle may be an acute angle.

The second angle maintenance part 140 prevents the open angle of the cover 150 from increasing above a predetermined angle. That is, the first angle maintenance part 130 and the second angle maintenance part 140 can maintain the angle of the cover 150 in a predetermined angle range or at a specified angle.

The first angle maintenance part 130 and the second angle maintenance part 140 maintain the angle of the cover at least in the range of about 35° to about 55°. For example, the angle may be about 45°.

The first angle maintenance part 130 is formed to have specified elasticity/flexibility. If pressure over a predetermined level is applied to the cover 150, the hook part 154 of the cover 150 and/or the side part of the cover 150 is no longer be supported by the first angle maintenance part 130 and, as a result, covers the lamp terminal insertion grooves 122. The first angle maintenance part 130 as described above may be made from flexible materials, or may be formed to be thin enough to have sufficient elasticity to bend under such pressure.

The second angle maintenance part 140 is formed to project from the rear of the cover 150, and prevents the cover 150 from being rotated over a predetermined angle about the hinge 156. Like the first angle maintenance part 130, the second angle maintenance part 140 is formed to have specified elasticity/flexibility, and unlike the first angle maintenance part 130, it maintains the elasticity without relinquishing the support it provides for the cover 150, so that it can maintain the specified angle again when the pressure is removed. More than one second maintenance part 140 may be formed, and the second maintenance part 140 may be formed adjacent to the hinge 156.

Figure 5A:
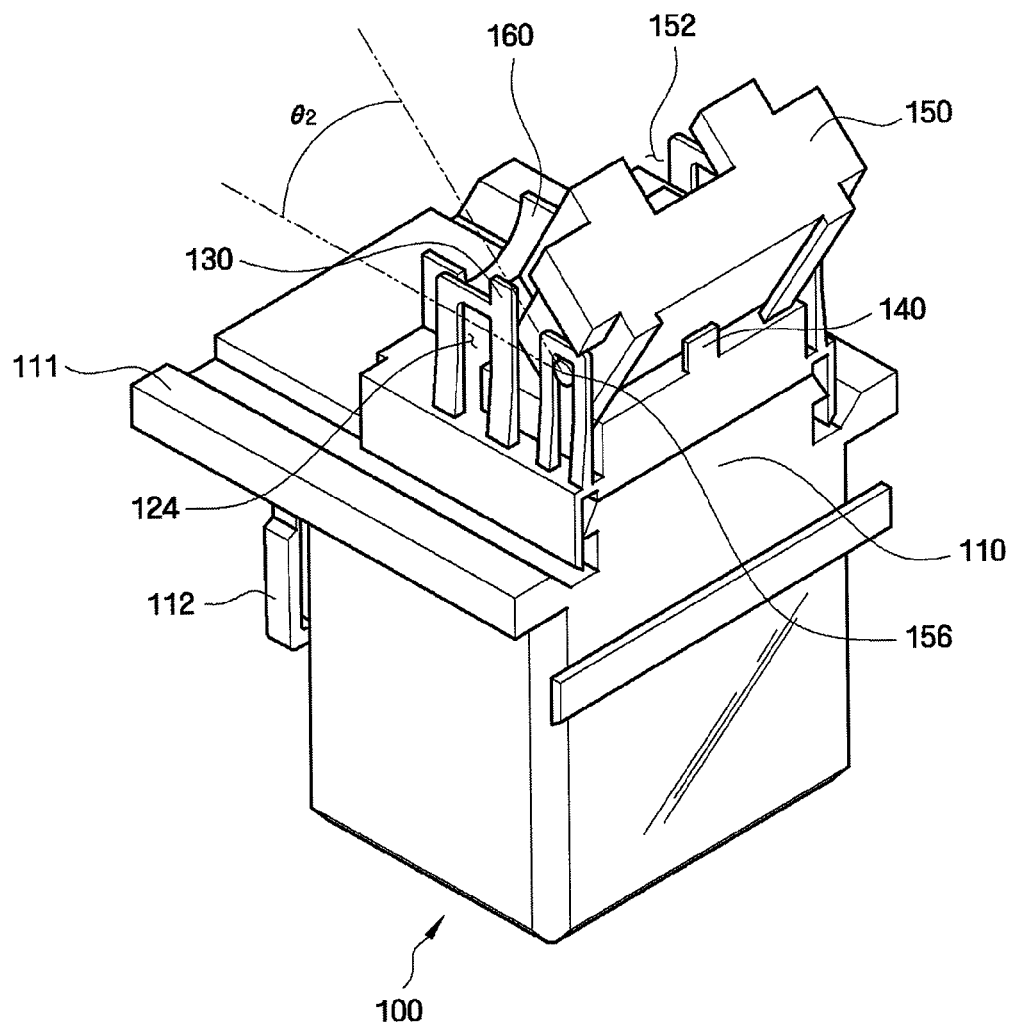
FIGS. 5A and 5B are perspective views for use in explaining the operation of the lamp socket of FIG. 1.
Figure 5B:
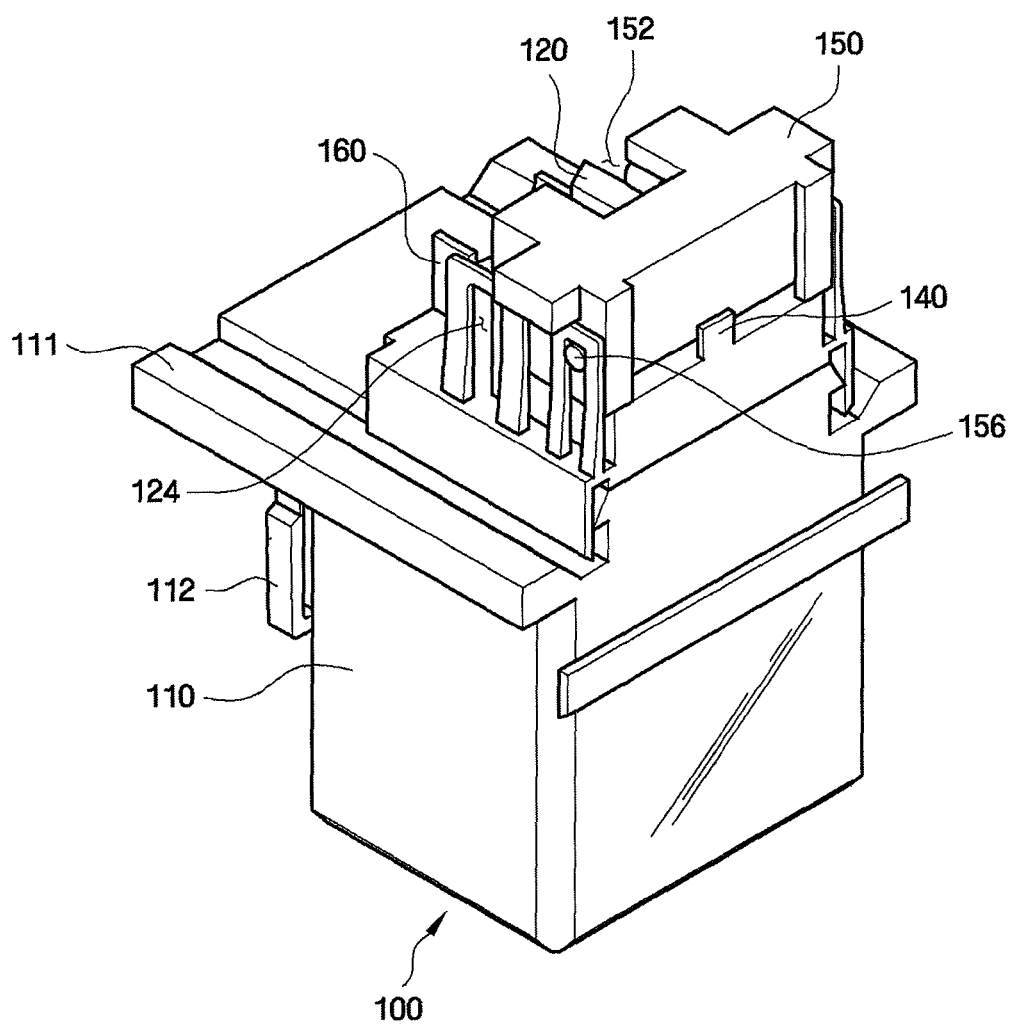

The operation of the lamp socket according to an embodiment of the present invention will be described in further detail with reference to FIGS. 5A and 5B. FIGS. 5A and 5B are perspective views for use in explaining the operation of the lamp socket of FIG. 1.

First, referring to FIG. 5A, on the lamp socket 100, the cover 150 is open at a specified angle $\theta_2$.

The cover 150 is supported by the first angle maintenance part 130 and the second angle maintenance part 140. Specifically, the first angle maintenance part 130 supports a side of the cover 150 and/or the hook part 154 to prevent the cover 150 from being closed, and the second angle maintenance part 140 supports the rear part of the cover 150 to prevent the cover 150 from being open over a predetermined angle. The open angle $\theta_2$ of the cover 150 may be kept at a predetermined angle or in a specified angle range. The open angle $\theta_2$ of the cover 150 may be adjusted based on whether the lamp terminals 71 can be easily inserted when the lamp 70 is vertically inserted and whether the cover 150 can be easily closed by vertical pressure being applied from the upper part of the cover 150 after the lamp 70 is inserted. The open angle $\theta_2$ of the cover 150 may be kept at least in the range of about 35° to about 55°, for example, at about 45°.

Referring to FIG. 5B, the lamp socket 100 is closed by pressure being applied to the cover 150. That is, as described above, the first angle maintenance part 130 has the elasticity, and if pressure over a predetermined level is applied, the first angle maintenance part 130 does not support the hook part 154 of the cover 150, but permits the cover to close. When the cover 150 is closed by the pressure applied thereto, the hook part 154 of the cover 150 and the hook groove 124 of the housing 110 are hook-engaged with each other, so that the cover 150 and the housing 110 are firmly fixed to each other.

Figure 6:
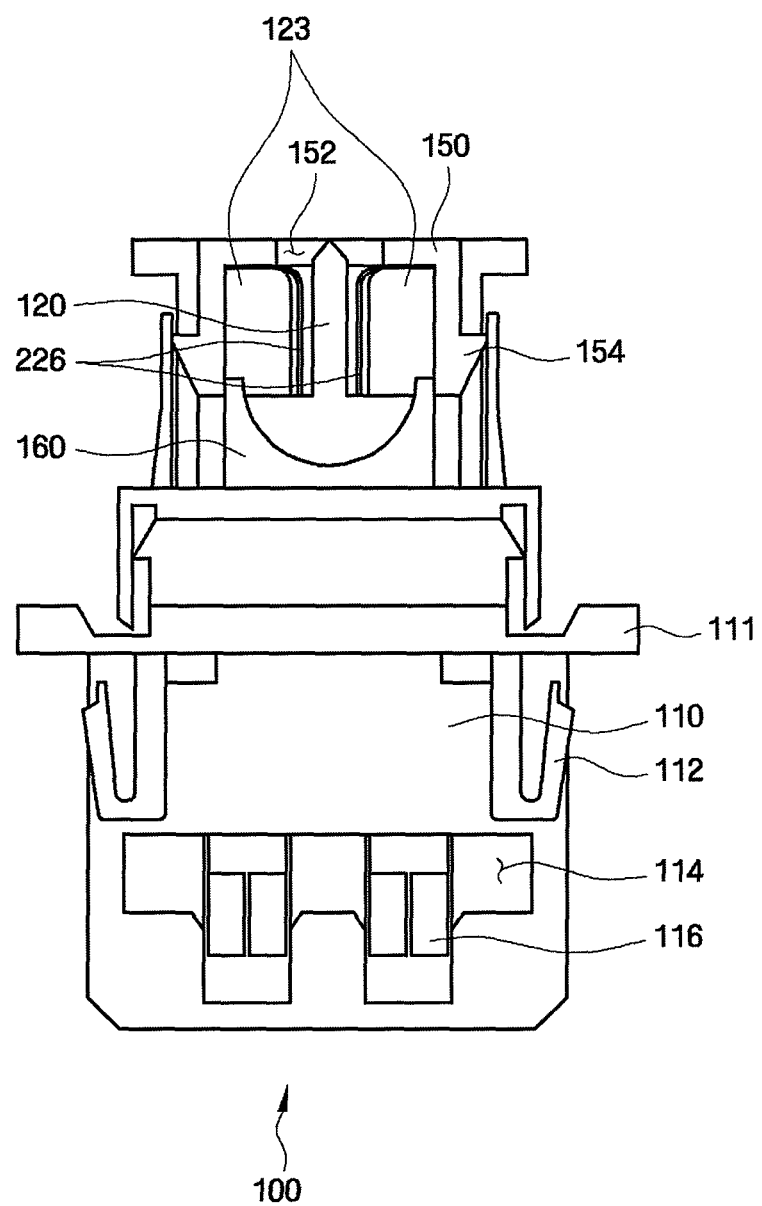
FIG. 6 is a front view of a lamp socket according to an embodiment of the present invention.
Figure 7:
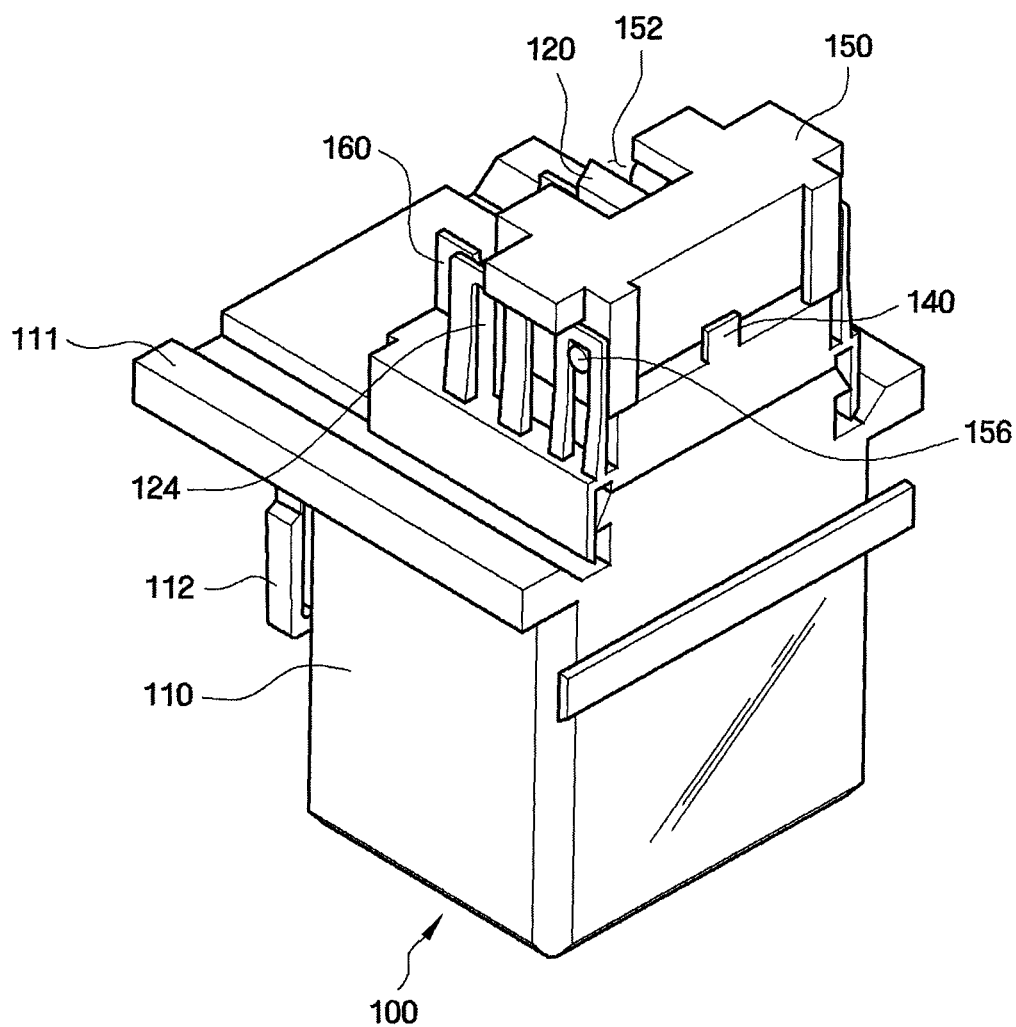
FIG. 7 is a rear perspective view of the lamp socket of FIG. 6.
Figure 8A:
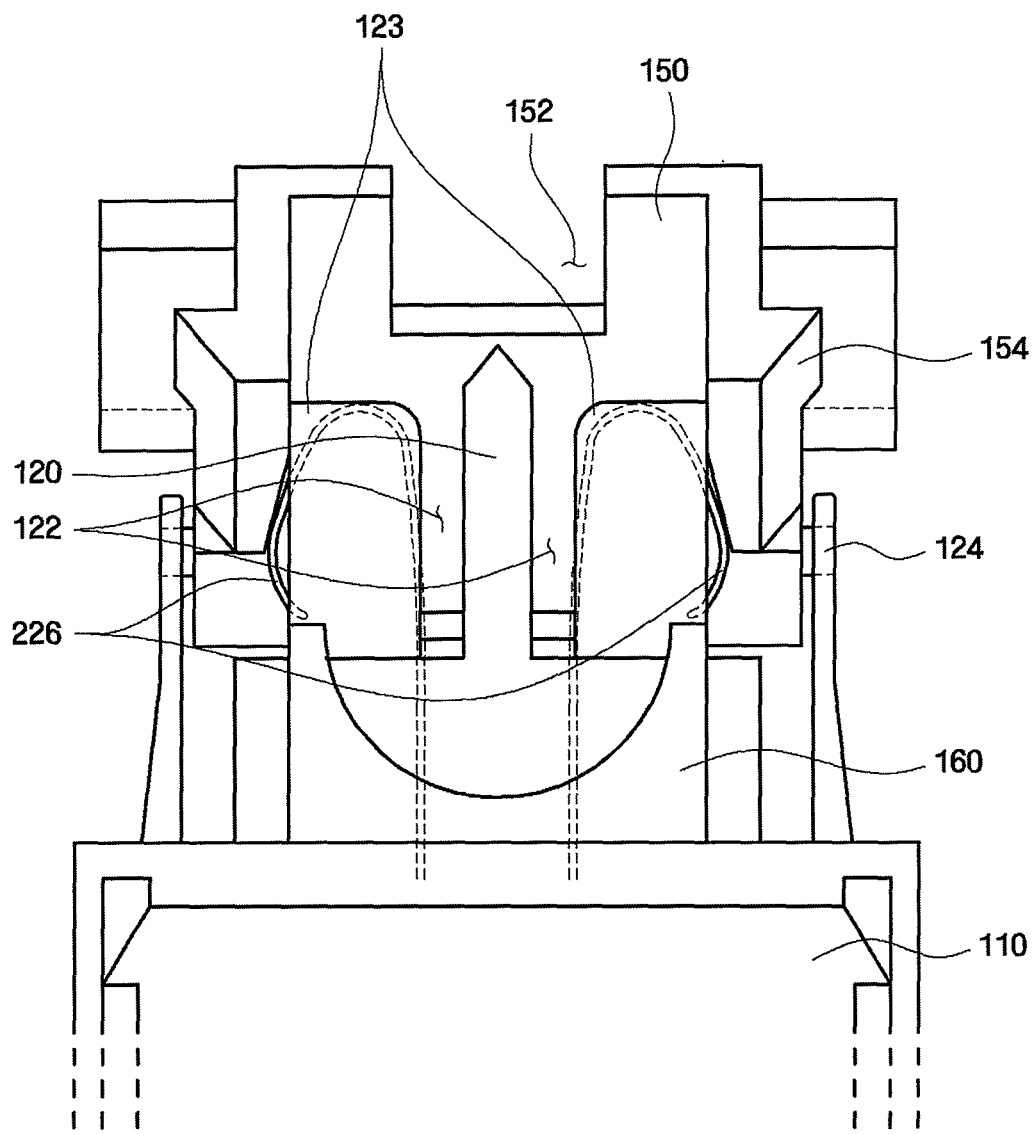
FIGS. 8A and 8B are views for use in explaining the operation of the lamp socket of FIG. 6.
Figure 8B:
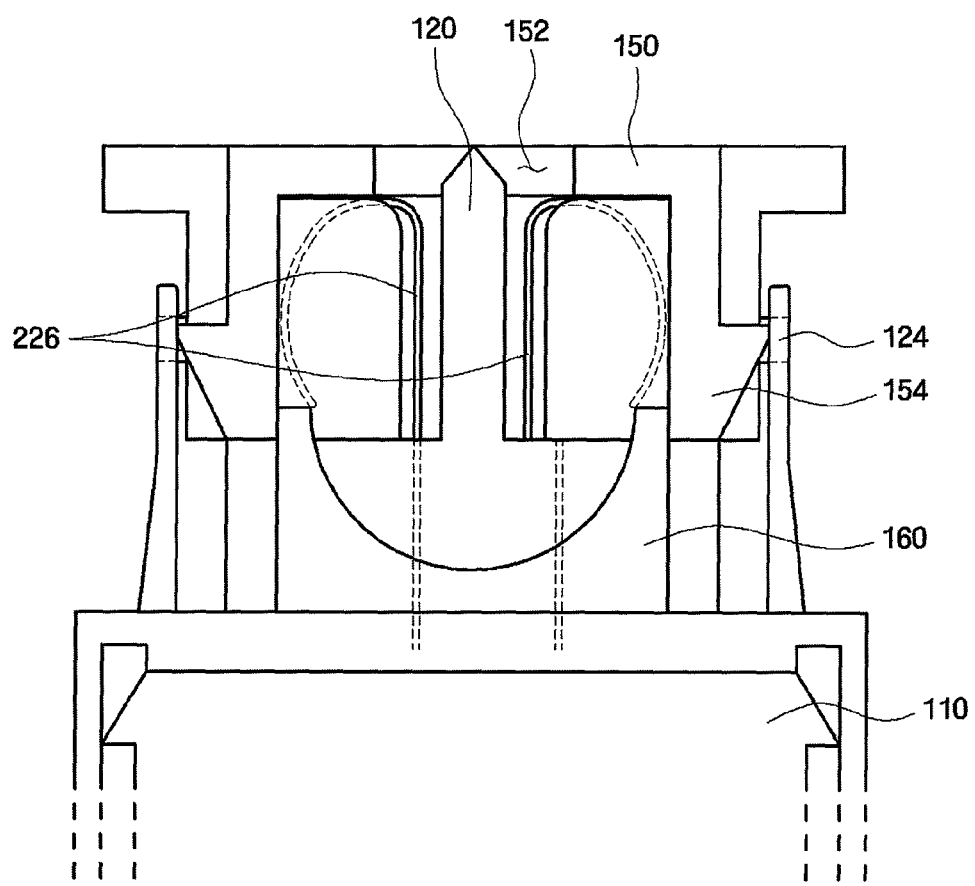

With reference to FIGS. 6 to 8B, the lamp socket according to an embodiment of the present invention will be described in detail. FIG. 6 is a front view of a lamp socket according to an embodiment of the present invention, and FIG. 7 is a rear perspective view of the lamp socket of FIG. 6. FIGS. 8A and 8B are views for use in explaining the operation of the lamp socket of FIG. 6. The lamp socket 100 according to the embodiment of the present invention described in connection with FIGS. 6-8B includes first connection terminals 226 and the second angle maintenance part 140 in order to maintain the open angle of the cover 150. Specifically, the first connection terminals 226 supply a driving voltage to the lamp 70, and parts of the first connection terminals 226 are projected to an outside of the support walls 123 to serve as the angle maintenance part. As illustrated in FIG. 8A, if the cover 150 is open, the parts of the first connection terminals 226 are projected to an outside of the support walls 123. The first connection terminals 226 have elasticity, and if specified pressure is applied from an outside of the support walls 123, the first connection terminals 226 are bent in a direction toward the lamp terminal insertion grooves 122. In this manner, the first connection terminals 226 provide support at or in the vicinity of the hook part 154 of the cover 150, so that the cover 150 can remain open at a specified angle.

On the other hand, the second angle maintenance part 140 prevents the cover 150 from being open over a specified angle.

Hereinafter, a process of opening/closing the cover 150 of the lamp socket 100 will be further described.

Referring to FIG. 8A, if the cover 150 is open, the first connection terminals 226 are projected to an outside of the support walls 123. At this time, the first connection terminals 226 inserted into the lamp terminal insertion grooves 122 are bent in a direction toward the outside of the support walls 123, and thus a space for inserting the lamp terminals 71 is made available in the lamp terminal insertion grooves.

Then, referring to FIG. 8B, if the lamp 70 is inserted and the first connection terminals 226 are pressed by the cover 150 to which the pressure is applied, the first connection terminals 226 are moved into the inside of the support walls 123, and are pushed inside the lamp terminal insertion grooves 122.

At this time, the inserted lamp terminals 71 are fixed by the guide member 120 and the first connection terminals 126, and the cover 150 covers upper ends of the support walls 123. Accordingly, the lamp 70 is fixed to the lamp socket 100, and it can be checked through the open part 152 whether the lamp 70 is accurately inserted into the lamp socket 100.

Figure 9A:
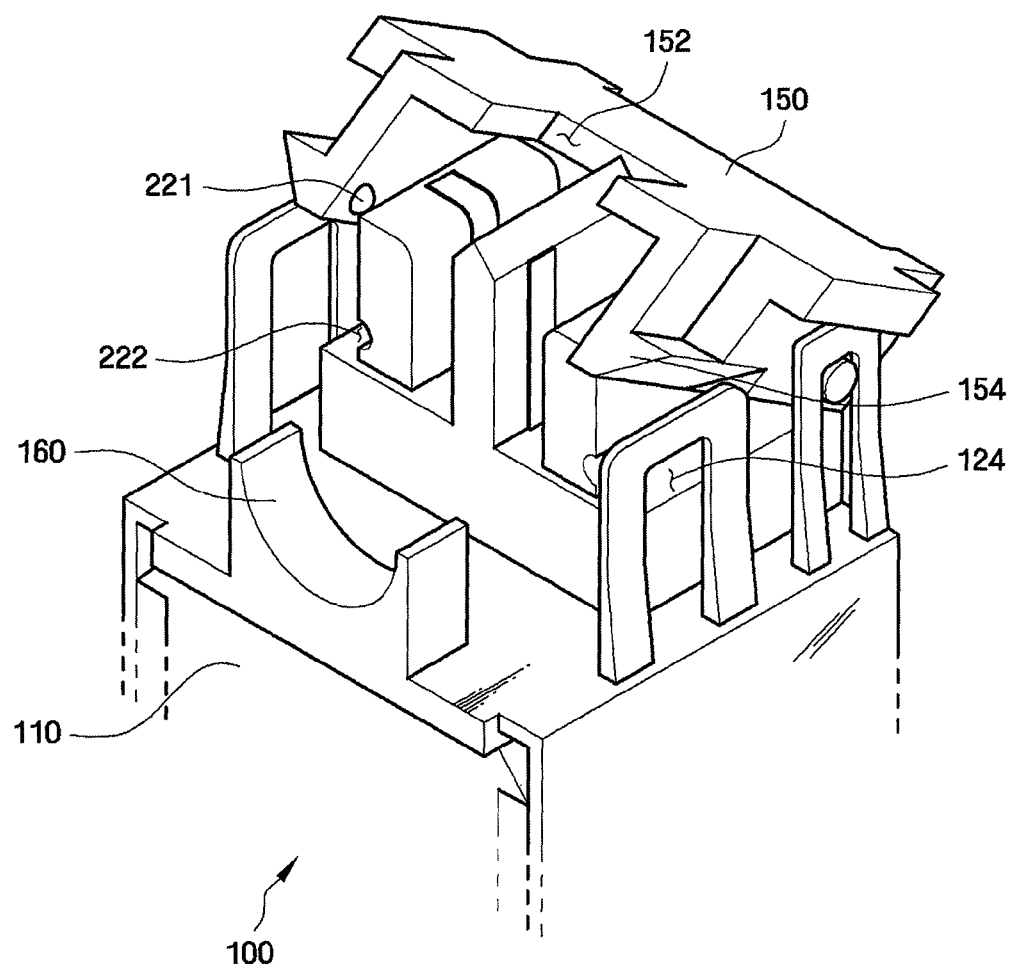
FIG. 9A is a perspective view of a lamp socket with its cover open according to an embodiment of the present invention.
Figure 9B:
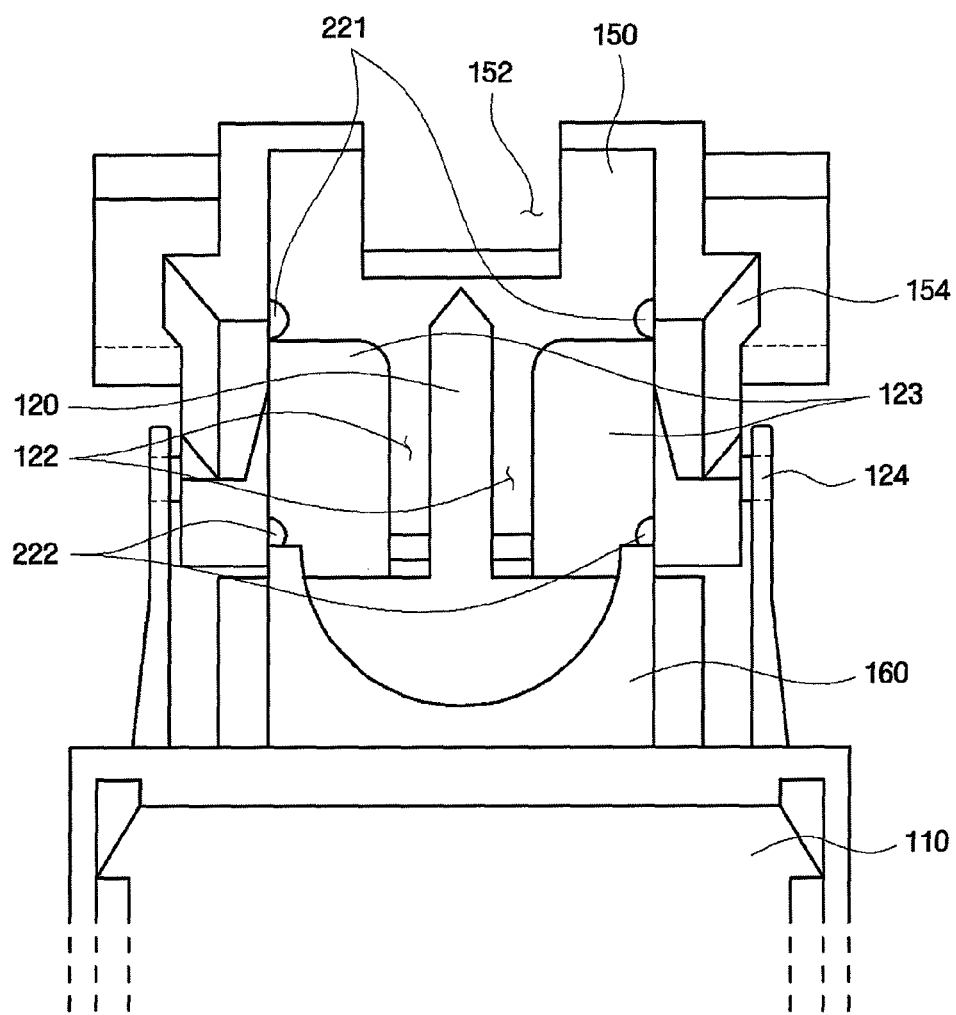
FIG. 9B is a front view of the lamp socket of FIG. 9A.
Figure 10A:
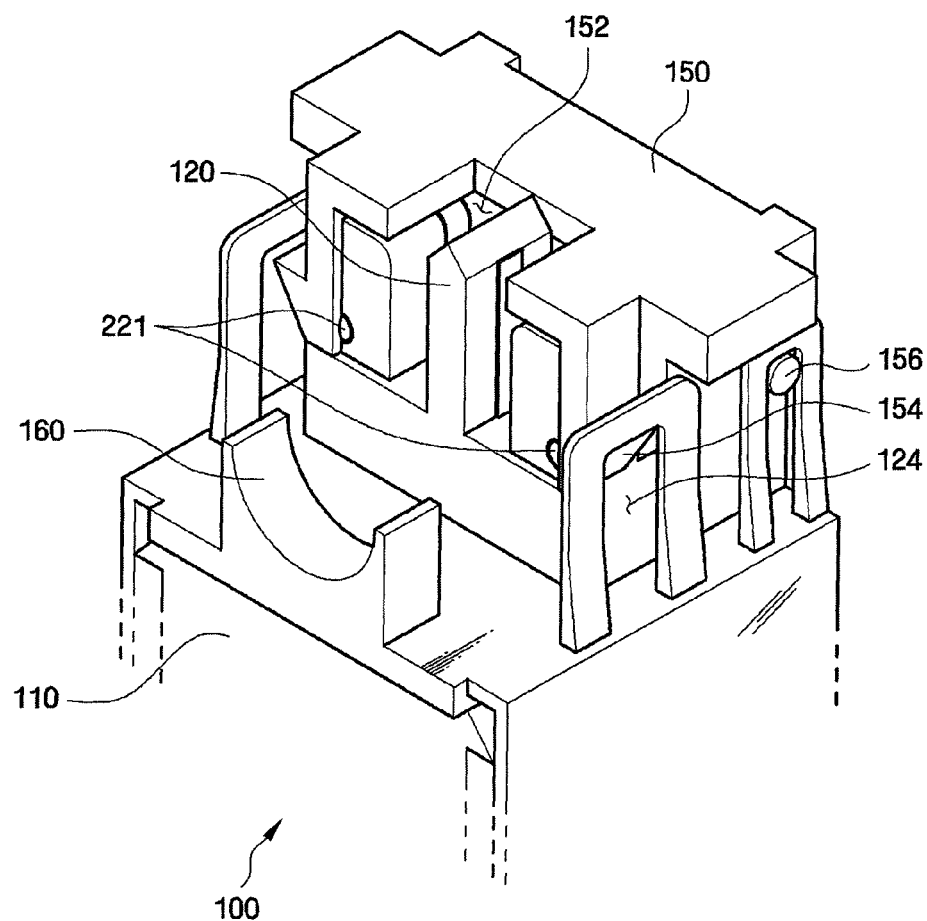
FIG. 10A is a perspective view of the lamp socket with its cover closed according to an embodiment of the present invention.
Figure 10B:
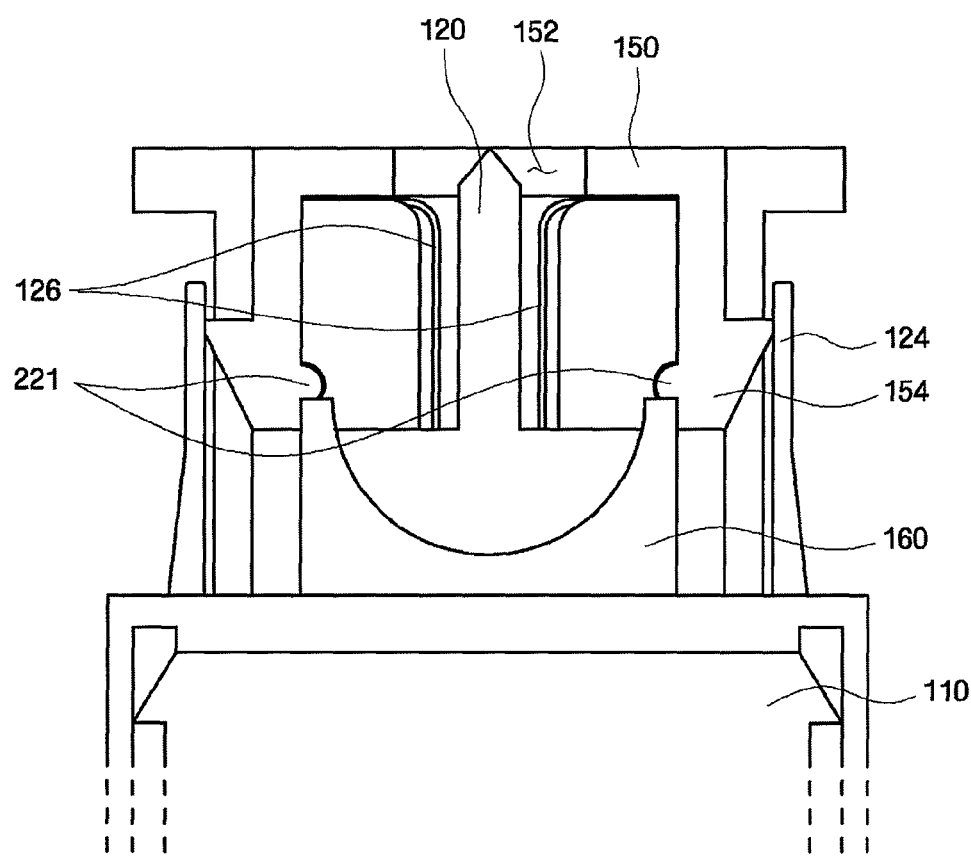
FIG. 10B is a front view of the lamp socket of FIG. 10A.

With reference to FIGS. 9A to 10B, the lamp socket according to an embodiment of the present invention will be described in detail. FIG. 9A is a perspective view of a lamp socket with its cover open according to an embodiment of the present invention, and FIG. 9B is a front view of the lamp socket of FIG. 9A. FIG. 10A is a perspective view of the lamp socket with its cover closed according to an embodiment of the present invention, and FIG. 10B is a front view of the lamp socket of FIG. 10A.

The lamp socket 100 according to the embodiment of the present invention described in connection with FIGS. 9A-10B includes fixing projections 221 and the second angle maintenance part 140 in order to maintain the open angle of the cover 150. Specifically, the fixing projections 221 are formed on inner side surfaces of the cover 150. When the cover is open as shown in FIGS. 9A-9B, the fixing projections 221 are supported by the support walls 123 to maintain the open angle of the cover 150. The fixing projections 221 are supported by the support walls 123, and if pressure over a predetermined level is applied, the fixing projections 221 are deformed to permit the cover 150 to be moved to the closed position.

When the cover 150 is in the closed position and covers the upper end part of the support walls 123, the fixing projections 221 are engaged with the fixing grooves 222 to fix the cover to the housing 110.

Hereinafter, a process of opening/closing the cover 150 of the lamp socket 100 will be described.

Referring to FIGS. 9A and 9B, if the cover 150 is open, the fixing projections 221 are hooked on the upper end parts of the support walls 123 to permit the cover to be kept at a specified angle. At this time, the second angle maintenance part 140 prevents the cover 150 from being opened over a predetermined angle.

Then, referring to FIGS. 10A and 10B, if the lamp 70 is inserted and the fixing projections 221 formed on the inner wall of the cover 150 are pressed by the cover 150 to which the pressure is applied, the fixing projections 221 are elastically deformed together with the cover 150 to be permitted to slide along the outside of the support walls 123, and the cover 150 covers at least the upper ends of the support walls 123. Accordingly, the lamp 70 is fixed to the lamp socket 100, and it can be checked through the open part 152 whether the lamp 70 is accurately inserted into the lamp socket 100.

Figure 11A:
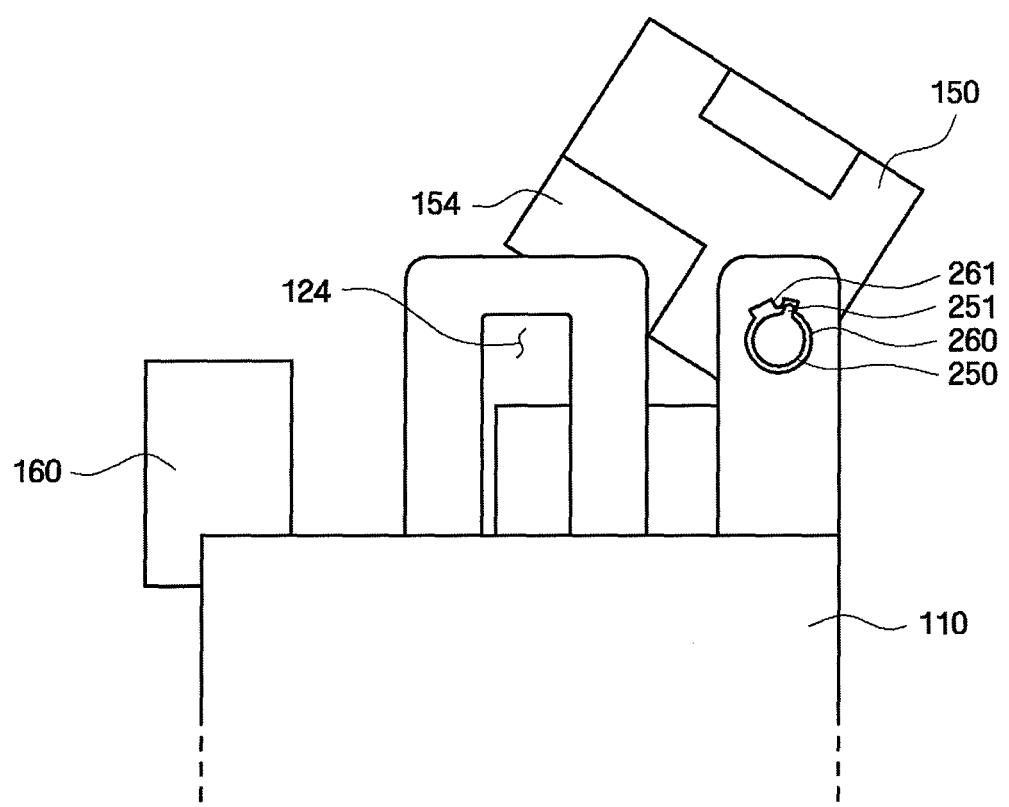
FIG. 11A is a side view of a lamp socket in an open state according to an embodiment of the present invention.
Figure 11B:
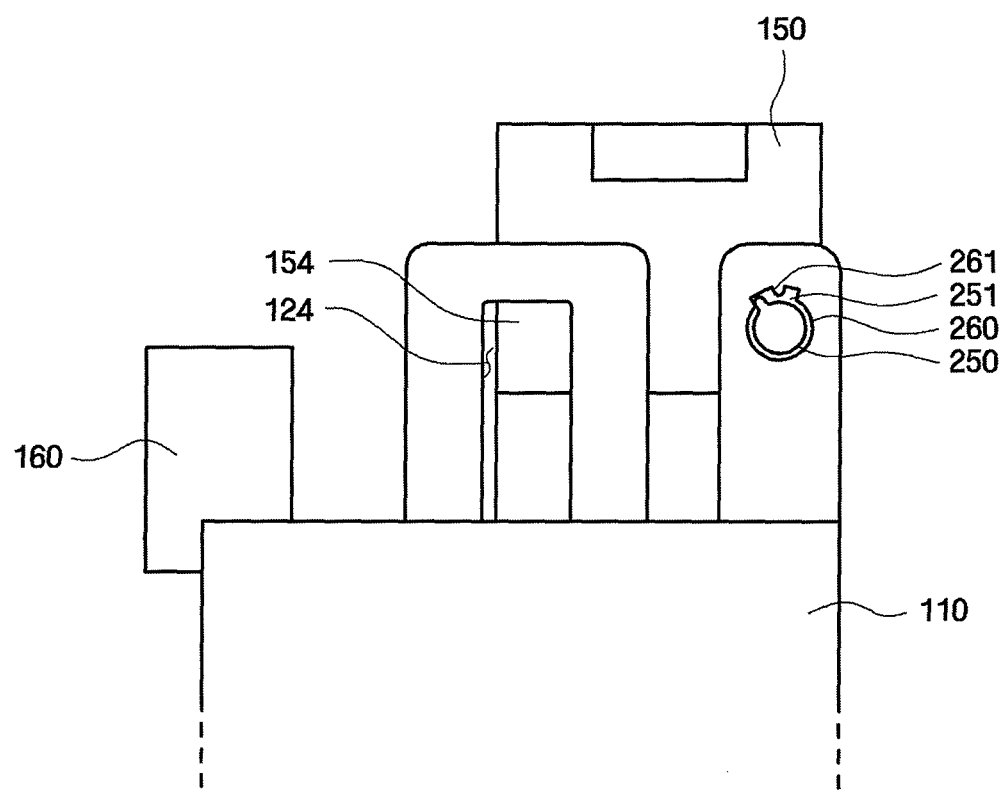
FIG. 11B is a side view of the lamp socket of FIG. 11A in a closed state.

With reference to FIGS. 11A and 11B, the lamp socket according to an embodiment of the present invention will be described in detail. FIG. 11A is a side view of a lamp socket in an open state according to an embodiment of the present invention, and FIG. 11B is a side view of the lamp socket of FIG. 11A in a closed state.

The lamp socket 100 according to the embodiment of the present invention described in connection with FIGS. 11A-11B includes a first projection 251 formed on a hinge shaft 250 and a second projection 261 formed as part of a hinge hole 260.

In the lamp socket 100, the cover 150 and the housing 110 are hinge-engaged with each other to open/close the lamp socket 100. The cover 150 includes the hinge shaft 250, and the housing 110 includes the hinge hole 260, so that the hinge shaft 250 is rotatable in the hinge hole 260.

The first projection 251 is formed on the periphery of the hinge shaft 250, and the second projection 261 is formed as part of the hinge hole 260. If pressure over a predetermined level is applied, the first projection 251 and the second projection 261 are elastically deformed. That is, if the first projection 251 and the second projection 261 support each other, the cover 150 is kept in an open state, while if pressure over a predetermined level is applied to the first projection 251 and the second projection 261, they are elastically deformed to pass each other, so that the cover 150 is closed.

Specifically, referring to FIG. 11A, if the first projection 251 and the second projection 261 support each other, the hinge shaft 250 cannot be rotated in the hinge hole 260. Accordingly, the cover 150 connected to the hinge shaft 250 is in an open state.

On the other hand, referring to FIG. 11B, if a specified force is applied to the cover 150, torque is generated on the hinge shaft 250 connected to the cover 150. If the torque exceeds a predetermined level, the first projection 251 and the second projection 261 are elastically deformed, and thus the first projection 251 passes out of the second projection 261. Accordingly, the hinge shaft 250 is rotated along the hinge hole 260, and thus the cover 150 connected to the hinge shaft 250 is moved to a closed state.

As described above, the first projection 251 and the second projection 261 can be deformed in various shapes, and the deformation position can be variously changed.

Figure 12:
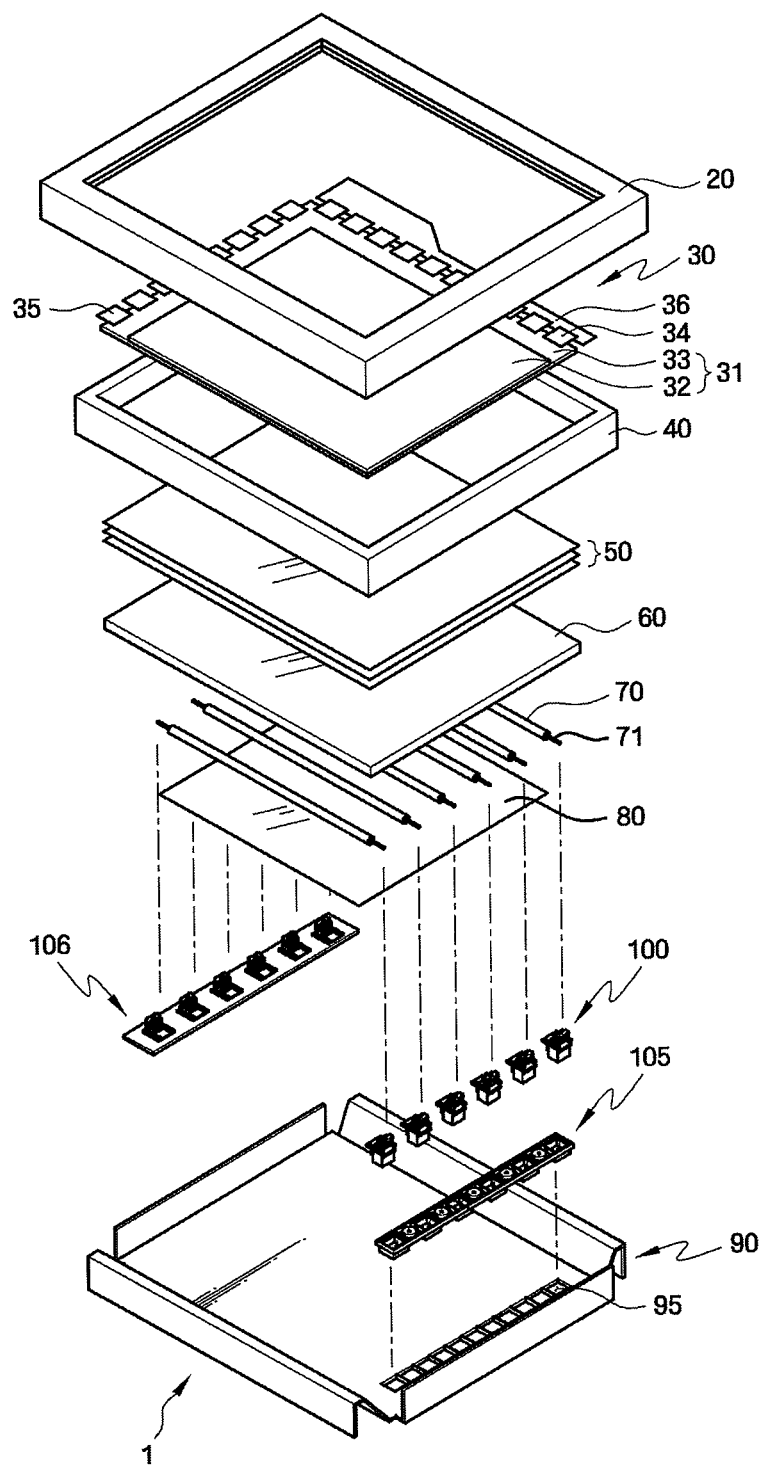
FIG. 12 is an exploded perspective view of a liquid crystal display including a lamp socket according to an embodiment of the present invention.

With reference to FIG. 12, a liquid crystal display according to an embodiment of the present invention will be described in detail. FIG. 12 is an exploded perspective view of a liquid crystal display including a lamp socket according to an embodiment of the present invention.

The liquid crystal display 1 according to an embodiment of the present invention includes a liquid crystal display panel assembly 30, an upper receptacle 20, an intermediate frame 40, optical sheets 50, a diffusion plate 60, lamps 70, lamp sockets 100, a socket guide 105, and a lower receptacle 90.

The liquid crystal display panel assembly 30 includes a liquid crystal display panel 31 composed of a thin film transistor display plate 32, a common electrode display plate 33, and a liquid crystal layer (not illustrated) interposed between the two display plates, a gate tape carrier package 35, a data tape carrier package 34, and an integrated printed circuit board 36.

The liquid crystal display panel 31 includes the thin film transistor display plate 33 composed of gate lines (not illustrated), data lines (not illustrated), a thin film transistor array, pixel electrodes, and the like, and a common electrode display plate 32 composed of black matrices, common electrodes, and the like, and arranged to face the thin film transistor display plate 33. The liquid crystal display panel 31 serves to display image information.

In addition, the gate tape carrier package 35 is connected to the respective gate lines (not illustrated) formed on the thin film transistor display plate 33, and the data tape carrier package 34 is connected to the respective data lines (not illustrated) formed on the thin film transistor display plate 33. Here, the gate tape carrier package 35 and the data tape carrier package 34 include a wiring pattern in which a semiconductor chip is formed on a base film, and a TAB (Tape Automated Bonding) tape bonded by a TAB technology.

On the printed circuit board 36, various driving elements for inputting gate drive signals to the gate tape carrier package 35 and inputting data driving signals to the tape data carrier package 34 are mounted.

The upper receptacle 20 forms an external appearance of the liquid crystal display 1, and provides a space for receiving the liquid crystal display panel assembly 30. In the center of the upper receptacle 20, an open window for exposing the liquid crystal display panel 31 to an outside is formed.

The upper receptacle 20 is engaged with the lower receptacle 90 via the intermediate frame 40.

The intermediate frame 40 receives therein the optical sheets 50, the diffusion plate 60, the lamps 70, the lamp sockets 100, and the socket guide 105, and is safely fixed to the lower receptacle 90. The intermediate frame 40 is composed of side walls formed along rectangular edges, and an open window, for transmitting light having passed through the diffusion plate 60 and the optical sheets 50, is formed in the center of the intermediate frame 40.

The optical sheets 50, which serve to diffuse and condense light transferred from the diffusion plate 60, are arranged on an upper part of the diffusion plate 60, and are received in the intermediate frame 40. The optical sheets 50 include a first prism sheet, a second prism sheet, a protection sheet, and the like.

The first and second prism sheets concentrate light incident at a low angle on the front by refracting the light having passed through the diffusion plate 60, and improve the brightness of the liquid crystal display in an effective viewing angle range.

The protection sheet formed on the first and second prism sheets not only protects the surface of the prism sheet but also diffuses light in order to make the light distribution uniform. The construction of the optical sheets 50 is not limited to that as described above, but can be diversely modified in accordance with the specification of the liquid crystal display 1.

The diffusion plate 60 diffuses light from a light source in directions so that a bright defect(s), which appears as a bright portion in accordance with the shape of a light source unit 81 that is a point light source, is not shown in the front of the liquid crystal display 1.

Examples of the lamp 70 may include a cold cathode fluorescent lamp (CCFL), a hot cathode fluorescent lamp (HCFL), and the like. In the case of the CCFL, two terminals are provided on each of both ends thereof. The terminals 71 are inserted into the lamp sockets 100 and ground sockets 106 to supply the power.

The lamp socket 100 is inserted into the lamp guide 105, and is exposed to the bottom surface of the lower receptacle 90 through the socket insertion opening 95 formed on the bottom surface of the lower receptacle 90. An inverter (not illustrated) is inserted into the lamp socket 100 exposed through the socket insertion opening 95.

With reference to FIGS. 13A to 13D, a method of manufacturing a liquid crystal display according to an embodiment of the present invention will be described in detail. FIGS. 13A to 13D are views for use in explaining a method of manufacturing a liquid crystal display according to an embodiment of the present invention.

Figure 13A:
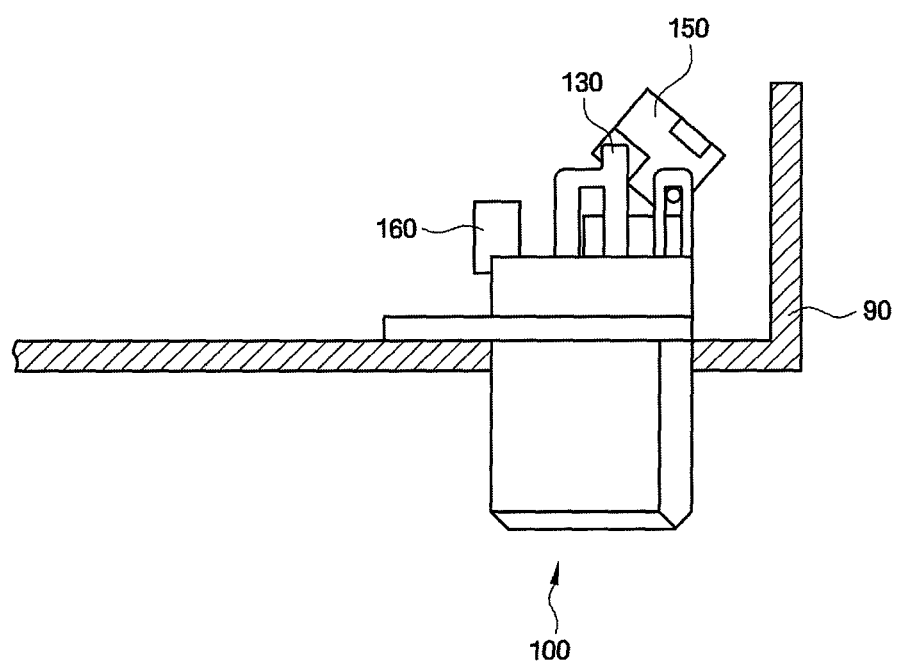
FIGS. 13A to 13D are views explaining a method of manufacturing a liquid crystal display according to an embodiment of the present invention.

First, referring to FIG. 13A, the lamp socket 100 including the cover 150 which is kept open at specified angle by the first angle maintenance part 130 and the second angle maintenance part 140 is inserted onto the bottom surface of the lower receptacle 90.

Figure 13B:
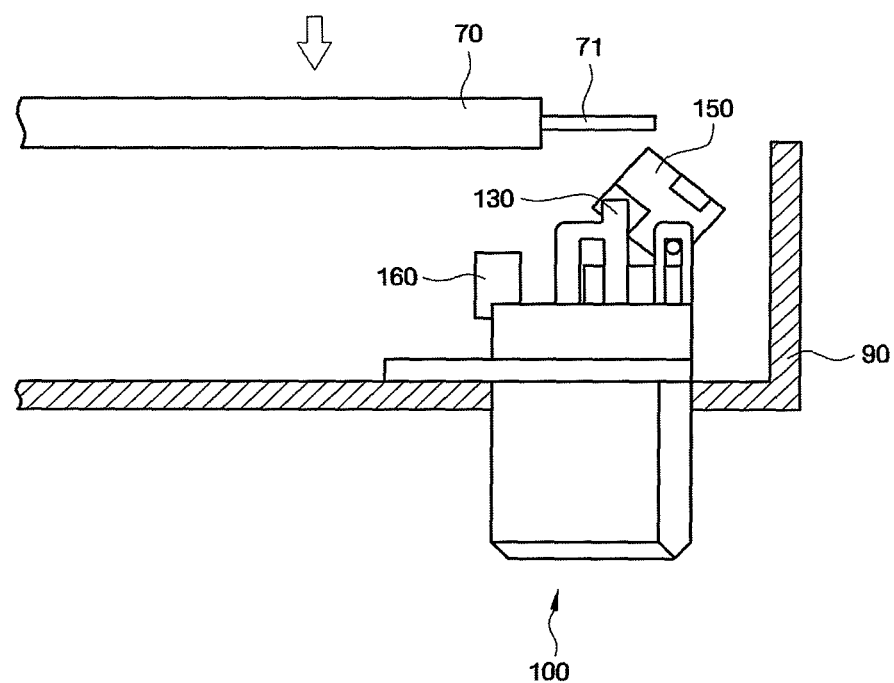

Then, referring to FIG. 13B, the lamp 70 is moved from the upper part of the lamp socket 100 and is inserted into the lamp socket 100. At this time, the lamp terminals 71 are inserted into the lamp terminal insertion grooves 122, respectively.

Figure 13C:
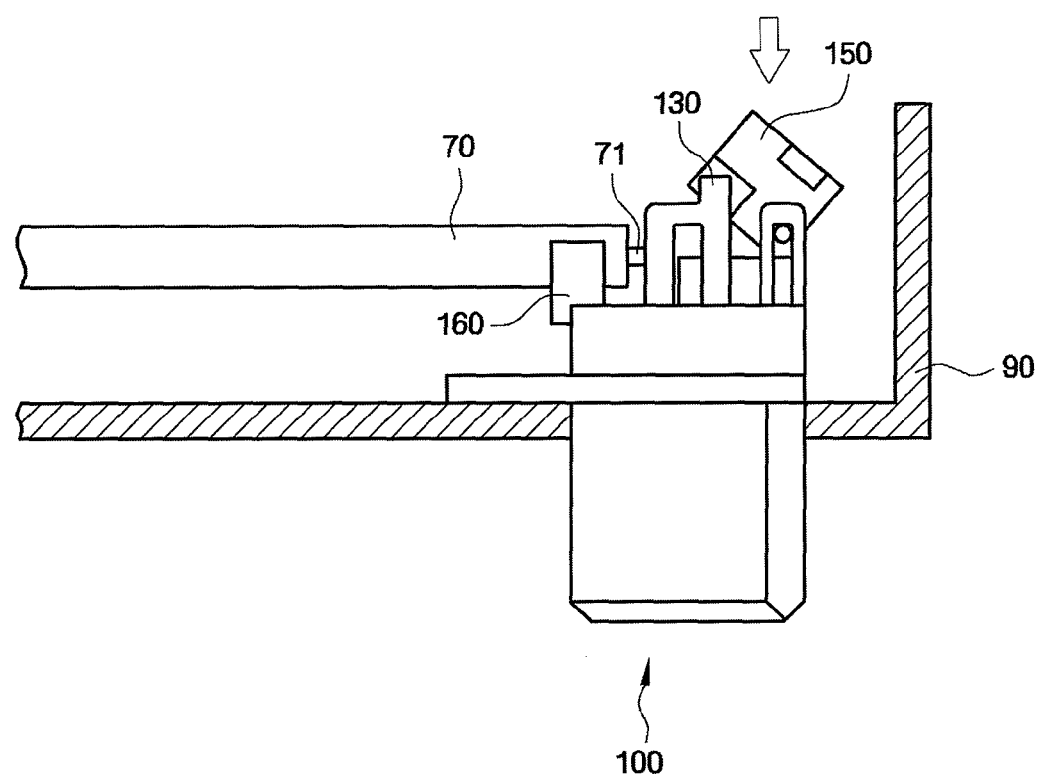

Then, referring to FIG. 13C, specified pressure (as shown by the arrow) is applied to the cover 150 after the lamp 70 is inserted into the lamp socket 100. At this time, the cover 150, which is kept open at the specified angle by the first angle maintenance part 130, is closed by the pressure acting from the upper side. This work can be automatically performed through automation equipment that applies the vertical pressure, which corresponds to the insertion direction of the lamp 70, to the upper part of the cover 150.

Figure 13D:
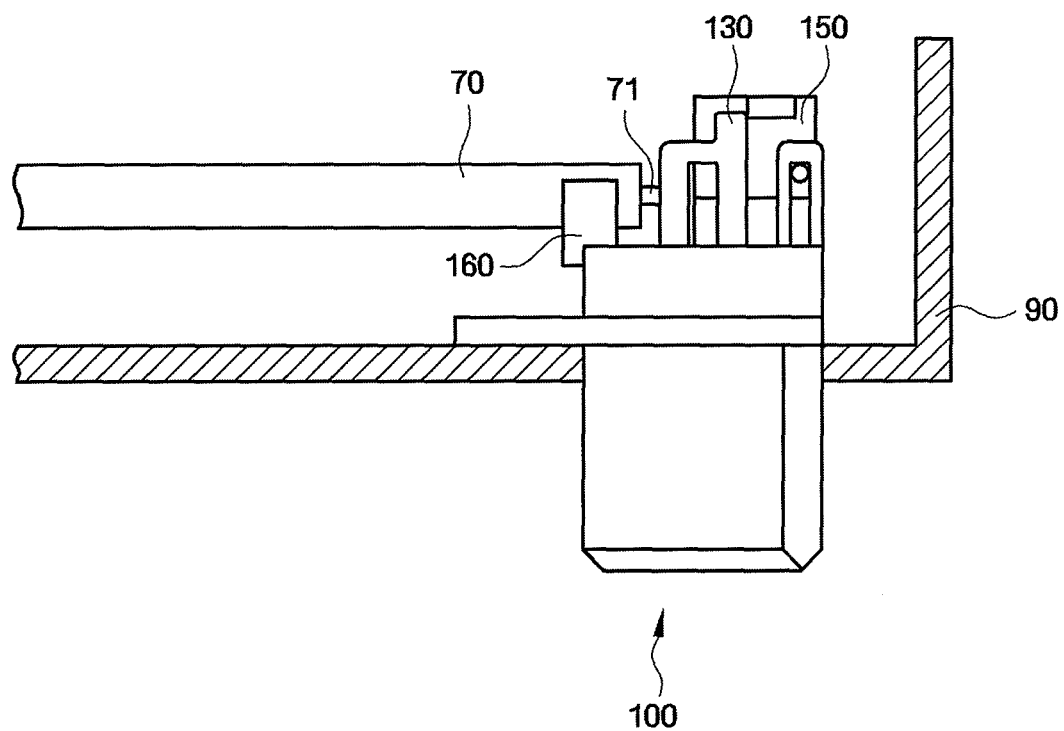

Referring to FIG. 13D, after the lamp 70 is inserted, it is confirmed whether the lamp 70 is correctly inserted through the open part 152 formed on the upper surface of the cover 150.

According to the above-described manufacturing process, the assembling process can be simplified, and thus can be easily performed through automated assembling equipment.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A lamp socket comprising:
a housing including connection terminals electrically connected to lamp terminals;
a cover rotatably hinge-engaged with the housing; and
an angle maintenance part maintaining an angle of the cover in an open position, wherein the angle is an acute angle with respect to an axis extending in a direction parallel to an extension direction of a lamp when the lamp is positioned in the lamp socket.

2. The lamp socket of claim 1, wherein the cover comprises an open part exposing at least part of the lamp terminals when the cover is in a closed position.

3. The lamp socket of claim 2, wherein the open part is a cut-out portion formed at an end of the cover.

4. The lamp socket of claim 1, wherein the housing and the cover are hinge-engaged with each other.

5. The lamp socket of claim 1, wherein the angle maintenance part comprises a first angle maintenance part controlling a lower limit of the angle, and a second angle maintenance part controlling an upper limit of the angle.

6. The lamp socket of claim 5, wherein the first angle maintenance part is an elastic member formed on at least one of the housing and the cover, and if pressure over a predetermined level is applied to the cover, the first angle maintenance part is deformed to allow closing of the cover.

7. The lamp socket of claim 5, wherein the second angle maintenance part is a projection projected from the housing or the cover.

8. The lamp socket of claim 5, wherein the second angle maintenance part is a projection foamed on the periphery of a shaft for a hinge, and controls rotation of the cover about the hinge.

9. The lamp socket of claim 1, further comprising a guide member formed between the connection terminals to guide the lamp terminals when the lamp is inserted into the lamp socket.

10. The lamp socket of claim 9, further comprising support walls projected from the housing and located adjacent the lamp terminals to guide the lamp terminals together with the guide member, wherein the guide member is projected to a greater height than the support walls.

11. A liquid crystal display comprising:
a display panel;
lamps providing light to the display panel and including terminals;
a housing including connection terminals electrically connected to the lamp terminals;
a cover rotatably hinge-engaged with the housing; and
an angle maintenance part maintaining an angle of the cover in an open position, wherein the angle is an acute angle with respect to an axis extending in a direction parallel to an extension direction of a lamp when the lamp is positioned in the lamp socket.

12. The liquid crystal display of claim 11, wherein the cover comprises an open part exposing at least part of the lamp terminals when the cover is in a closed position.

13. The liquid crystal display of claim 12, wherein the open part is a cut-out portion formed at an end of the cover.

14. The liquid crystal display of claim 11, wherein the angle maintenance part comprises a first angle maintenance part controlling a lower limit of the angle, and a second angle maintenance part controlling an upper limit of the angle.

15. The liquid crystal display of claim 14, wherein the second angle maintenance part is a projection projected from the housing or the cover.

16. The liquid crystal display of claim 11, further comprising a hinge hole formed in the housing, and a hinge shaft attached to the cover and engaged with the hinge hole;
   wherein the angle maintenance part comprises a first projection and a second projection formed on the hinge hole and the hinge shaft, respectively.

17. The liquid crystal display of claim 12, further comprising a guide member formed between the connection terminals to guide the lamp terminals when the lamp is inserted into the housing.

\* \* \* \* \*